(12) United States Patent
Ko

(10) Patent No.: US 6,600,282 B2
(45) Date of Patent: Jul. 29, 2003

(54) CIRCUIT AND METHOD FOR PREVENTING ERRONEOUS OPENING AND CLOSING IN AN AUTOMATICALLY/MANUALLY FOLDABLE PORTABLE RADIO PHONE

(75) Inventor: Moon-Jung Ko, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/863,968

(22) Filed: May 23, 2001

(65) Prior Publication Data

US 2002/0036474 A1 Mar. 28, 2002

(30) Foreign Application Priority Data

Sep. 26, 2000 (KR) ......................................... 2000-56435

(51) Int. Cl.[7] ................................................. G05B 5/00
(52) U.S. Cl. ....................... 318/445; 318/105; 318/106; 318/441; 318/440; 318/528
(58) Field of Search ................................. 318/105, 106, 318/441, 439, 440, 445, 454, 528

(56) References Cited

U.S. PATENT DOCUMENTS

| | | | | | |
|---|---|---|---|---|---|
| 4,430,604 A | * | 2/1984 | Loganbill et al. | ........... | 318/379 |
| 4,719,395 A | * | 1/1988 | Aoi et al. | .................... | 318/549 |
| 5,698,823 A | * | 12/1997 | Tanahashi | .................... | 318/721 |
| 5,821,476 A | * | 10/1998 | Hakala et al. | .............. | 318/441 |
| 6,366,041 B1 | * | 4/2002 | Bozio et al. | ................ | 318/280 |

* cited by examiner

Primary Examiner—Karen Masih
(74) Attorney, Agent, or Firm—Dilworth & Barrese, LLP

(57) ABSTRACT

Disclosed is a circuit and method for preventing erroneous opening and closing caused particularly, by use of a DC motor in an automatically/manually foldable portable radio terminal having a main body and a sub-body rotatable with respect to the main body. In the circuit, a motor provides rotating force to automatically raise or lower the sub-body, a motor driver drives the motor according to a motor driving direction control signal, an inverse electromotive force eliminator eliminates inverse electromotive force by opening or shorting both terminals of the motor according to an automatic mode or a manual mode, and a motor power controller controls supplying a driving power voltage to the motor. In the method of operating a folder, it is determined whether an automatic folder operation key has been pressed. Upon receipt of the automatic folder operation key input, a rectifier is turned on to open both terminals of a motor. At the end of the opening of the motor terminals, the motor is driven.

7 Claims, 7 Drawing Sheets

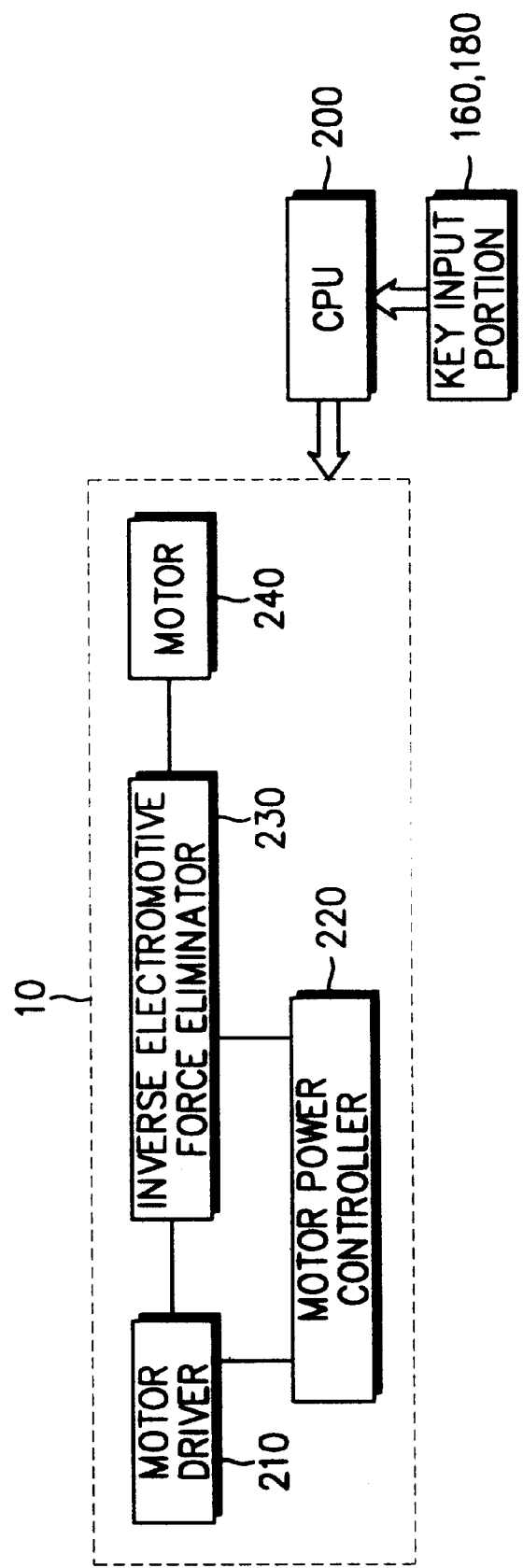

CIRCUIT AND METHOD FOR PREVENTING ERRONEOUS OPENING AND CLOSING IN AN AUTOMATICALLY/MANUALLY FOLDABLE PORTABLE RADIO PHONE

PRIORITY

This application claims priority to an application entitled "Circuit and Method for Preventing Erroneous Opening and Closing in Automatically/Manually Foldable Portable Radio Phone" filed in the Korean Industrial Property Office on Sept. 26, 2000 and assigned Serial No. 2000-56435, the contents of which are hereby incorporated by reference.

BACKGROUND OF THE INVENTION

1. Field of the Invention

The present invention relates generally to an automatically/manually foldable portable radio phone, and in particular, to a circuit and method for preventing an erroneous opening and closing of a sub-body on a main body regardless of the phone being in an automatic mode or a manual mode.

2. Description of the Related Art

In general, portable radio phones are classified into a bar type and a folder type. A decreasing number of individuals use bar type terminals since a keypad portion is exposed from a main body. The foldable terminals have been developed in diverse forms so that a sub-body can be raised from or lowered to a main body to protect a keypad portion. The foldable terminals are also divided into a flip type characterized by use of a flip cover as a sub-body for protecting a keypad portion on a main body and collecting transmitted voice, and a flip-up type with a flip cover that is lifted upward from a main body. Such folder type terminals with LCD (Liquid Crystal Display) modules on their sub-bodies are popular in today's mobile society.

To satisfy diverse demands of users, an automatically/manually foldable portable phone has recently been developed in which a sub-body can be placed automatically/manually in an open position and a closed position by simple switching on a main body, as disclosed in Korea Application No. 1999-49228. The main user requirement of the automatically/manually foldable portable phone is stable operation in the opening and closing of a folder in both an automatic mode and in a manual mode, and when powered-off. When a DC motor is used, the known automatically/manually foldable portable phone may experience erroneous opening/closing of a sub-body from/to a main body due to inverse electromotive force generated in the DC motor. In addition, asynchronous timing between power application to the motor and control of a motor rotating direction in an automatic mode causes erroneous opening/closing of the sub-body.

SUMMARY OF THE INVENTION

It is, therefore, an object of the present invention to provide a circuit for ensuring normal opening/closing of a sub-body regardless of an automatic mode or a manual mode in an automatically/manually foldable portable radio phone.

It is another object of the present invention to provide a circuit for ensuring normal opening/closing of a sub-body even when a battery is powered-off in an automatically/manually foldable portable radio phone.

It is a further object of the present invention to provide a circuit for ensuring normal opening/closing of a folder when switching between an automatic mode and a manual mode in an automatically/manually foldable portable radio phone.

It is still another object of the present invention to provide a circuit for preventing erroneous opening/closing of a folder caused by inverse electromotive force generated from a motor in an automatic/manual mode in an automatically/manually foldable portable radio phone.

It is yet another object of the present invention to provide a method of ensuring normal opening/closing of a sub-body in an automatic mode in an automatically/manually foldable portable radio phone.

The foregoing and other objects are achieved by a circuit for preventing erroneous opening and closing caused particularly by use of a DC motor in an automatically/manually foldable portable radio terminal having a main body and a sub-body rotatable with respect to the main body. In the circuit, a motor provides rotating force to automatically raise or lower the sub-body, a motor driver drives the motor according to a motor driving direction control signal, an inverse electromotive force eliminator eliminates inverse electromotive force by opening or shorting both terminals of the motor according to an automatic mode or a manual mode, and a motor power controller controls supplying a driving power voltage to the motor.

BRIEF DESCRIPTION OF THE DRAWINGS

The above and other objects, features and advantages of the present invention will become more apparent from the following detailed description when taken in conjunction with the accompanying drawings in which:

FIG. 2 is a block diagram of an embodiment of a folder operation device in an automatically/manually foldable portable radio phone according to the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The present invention is applied to a portable terminal with a sub-body rotatable to an open position and a closed position with respect to a main body in an automatic/manual mode. An embodiment of the present invention will be described in context with a folder operation device for a folder type portable terminal by way of example.

Figure 1A:
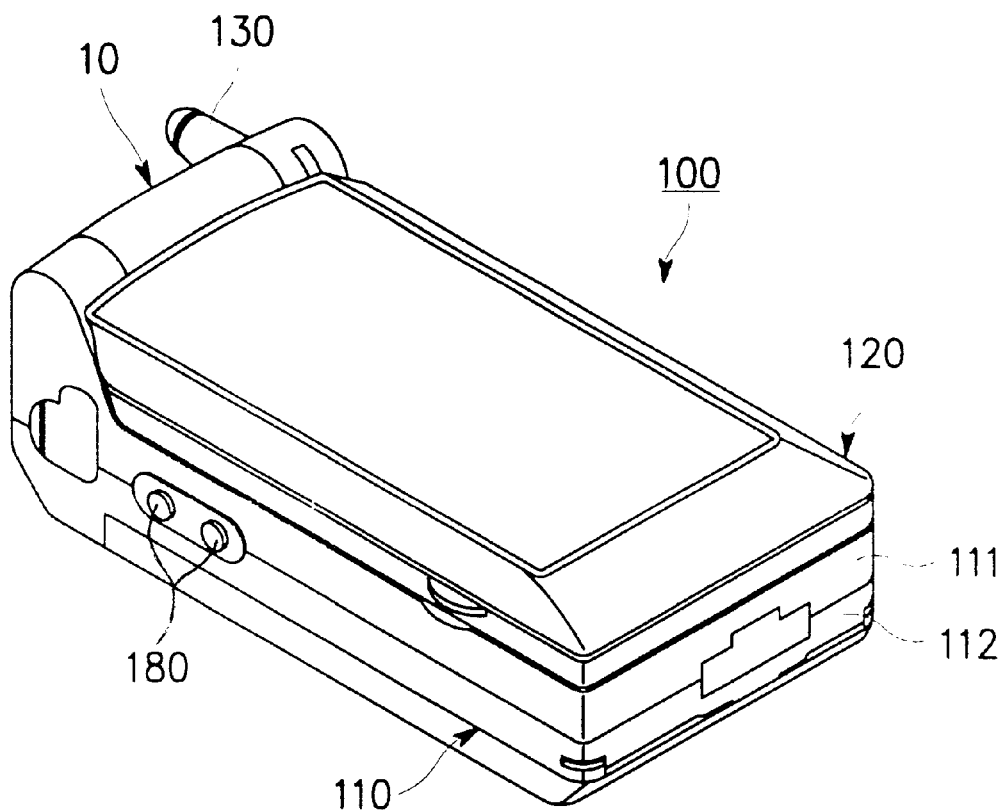
FIG. 1A is a perspective view of a portable radio phone with a sub-body in a closed position, to which the present invention is applied.
Figure 1B:
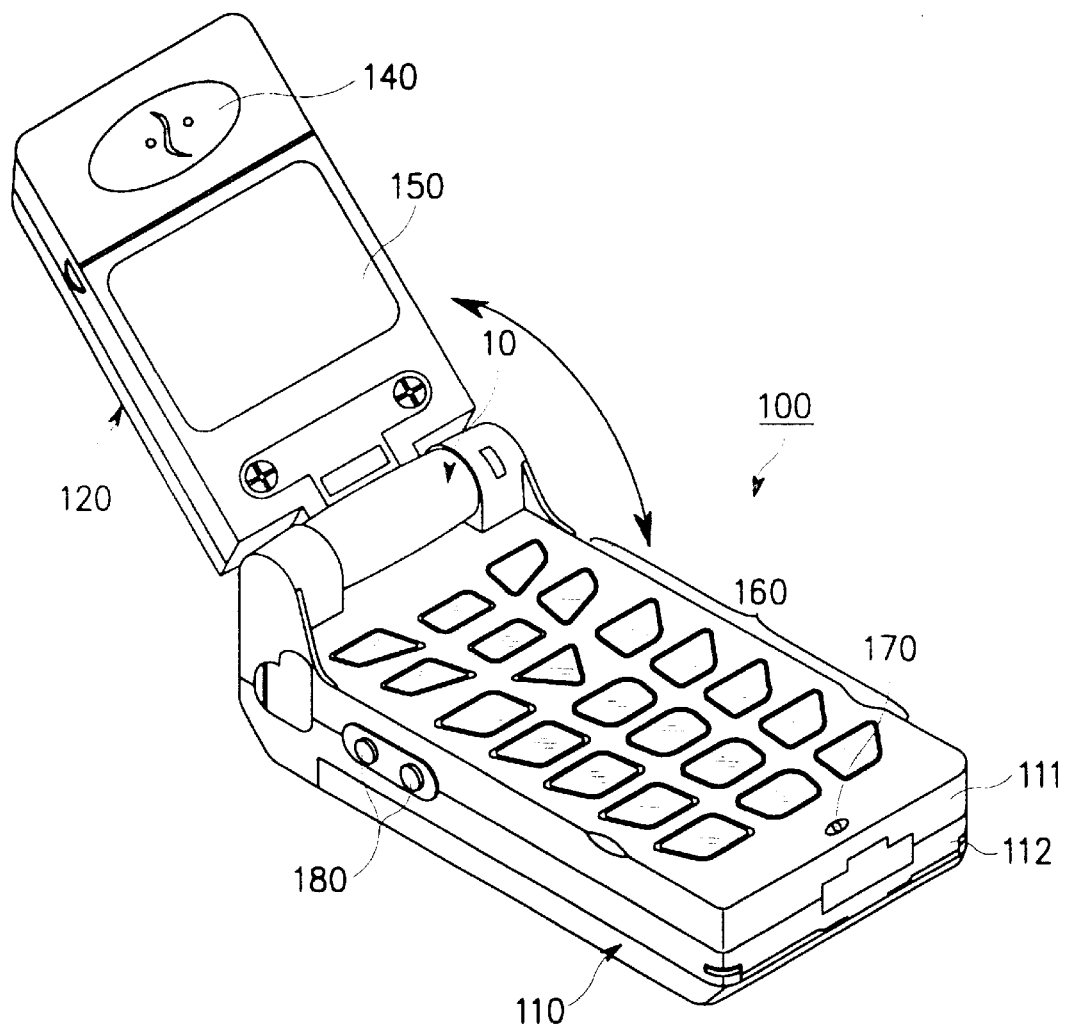
FIG. 1B is a perspective view of the portable radio phone shown in FIG. 1A with the sub-body in an open position with respect to a main body.

FIG. 1A is a perspective view of a portable radio phone with a sub-body in a closed position, to which the present invention is applied. FIG. 1B is a perspective view of the portable radio phone shown in FIG. 1A with the sub-body in an open position with respect to a main body. Referring to FIGS. 1A and 1B, the portable radio phone 100 includes a main body 110, a sub-body 120 mounted to the main body 110 to be rotatable to an open position and a closed position with respect to the main body 110 in an automatic or manual mode depending on user choice, and a folder operation device 10 for assisting in raising and lowering the sub-body 120. The main body 110 has an upper casing frame 111 and a lower casing frame 112 and an antenna device 130 is installed at one side of the uppermost end of the main body 110. An earpiece portion 140 is disposed on the surface of the sub-body 120 facing the main body 110 and an LCD module 150 is disposed as a display under the earpiece portion 140. A keypad portion 160 and a microphone 170 are sequentially formed on the main body 110. Automatic folder folding keys 180 are located along one side of the main body 110 to automatically fold/unfold the sub-body 120 with respect to the main body 110. A hinge module is used to connect the main body 110 to the sub-body 120. In the present invention, the folder operation device 10 is so configured that it functions as a hinge arm and folds/unfolds the sub-body 120 in an automatic/manual mode as well.

FIG. 2 is a block diagram of an embodiment of the folder operation device in an automatically/manually foldable portable radio phone according to the present invention. Referring to FIG. 2, a CPU (Central Processing Unit) 200 applies a control signal to the folder operation device 10 according to key data received from the key input portions 160 and 180 to control the folder operation device 10. The folder operation device 10 is comprised of a motor driver 210, a motor power controller 220, an inverse electromotive force eliminator 230, and a motor 240. The motor driver 210 drives the motor 240 in a rotating direction determined by a motor driving control signal received from the CPU 200. The inverse electromotive force eliminator 220 opens or shorts both terminals of the motor 240 according to an automatic mode or a manual mode to eliminate inverse electromotive force generated from the motor 240. The motor power controller 220 controls power supply to the motor driver 210 by a power control signal received from the CPU 200. The motor 240 rotates in the direction determined by the motor driving control signal received from the motor driver 210 so that it raises/lowers the sub-body 120 from/to the main body 110.

Figure 3:
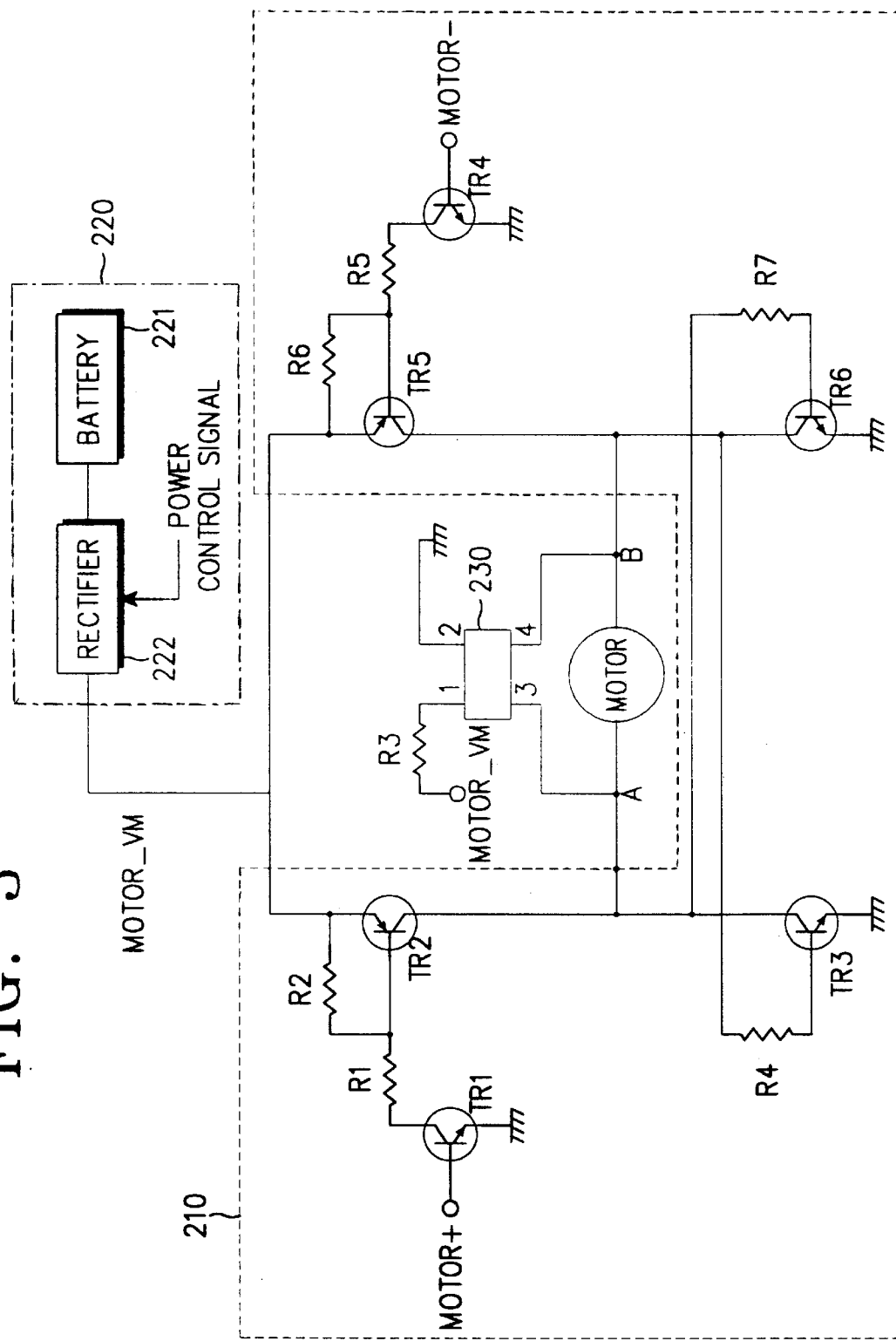
FIG. 3 is a detailed circuit diagram of the folder operation device shown in FIG. 2.

FIG. 3 is a detailed circuit diagram of the folder operation device shown in FIG. 2. Referring to FIGS. 1A, 1B, 2, and 3, the motor driver 210 has transistors TR1 to TR6 and resistors R1 to R7. The motor driver 210 receives a first motor driving control signal MOTOR+ from the CPU 200 via the first transistor TR1 and a second motor driving control signal MOTOR− from the CPU 200 via the fourth transistor TR4 at the same time. Then, the motor driver 210 determines the rotating direction of the motor 240 based MOTOR+ and MOTOR− and drives the motor 240 in the determined rotating direction by receiving motor driving power MOTOR_VM from the motor power controller 220.

The motor power controller 220, including a battery 221 and a rectifier 222, feeds/blocks a power voltage supplied from the battery 221 to/from the motor driver 210 and the inverse electromotive force eliminator 230 by turning off the rectifier 222 by a power control signal received from the CPU 200. That is, the motor power controller 220 receives a control signal from the CPU 200 indicating to turn-off the rectifier 222 and blocks a power voltage from the motor driver 210 and the inverse electromotive force eliminator 230. When the battery 221 is powered-off, the motor power controller 220 does not apply power to either the motor driver 210 or the inverse electromotive force eliminator 230. In an automatic mode, on the other hand, the motor power controller 220 receives a control signal indicating from the CPU 200 to turn-on the rectifier 222 and feeds a power voltage generated from the battery 221 to the motor driver 210 and the inverse electromotive force eliminator 230.

Figure 4:
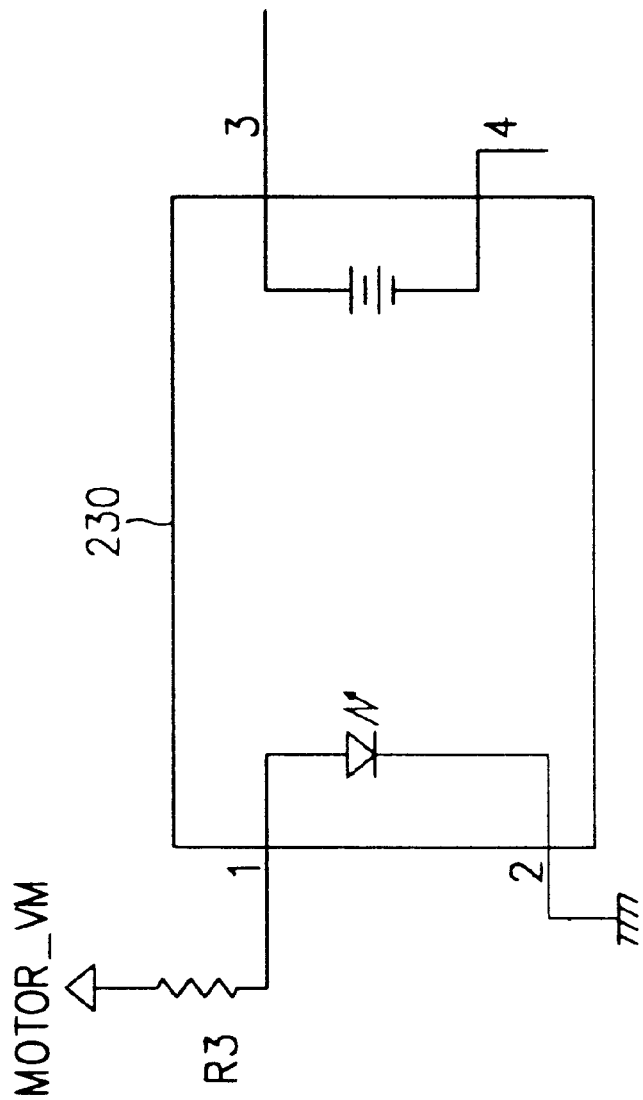
FIG. 4 is a circuit diagram of an inverse electromotive force eliminator shown in FIG. 3.

The inverse electromotive force eliminator 230 is connected to both terminals A and B of the motor 240. The inverse electromotive force eliminator 230 shorts the terminals A and B in the manual mode and opens them in the automatic mode. The inverse electromotive force eliminator 230 can be implemented by use of a photo MOS relay as shown in FIG. 4. The photo MOS relay has channel pins #3 and #4 connected to the terminals A and B of the motor 240. When the motor 240 is powered-off, the photo MOS relay is switched on with a resistance of 8 Ω. While the motor 240 is powered-on, a driving current flows through its pins #1 and #2, thereby turning off channels #3 and #4. On battery-off or in the manual mode, the inverse electromotive force eliminator 230 does not receive a driving voltage from the motor power controller 220 and thus a pure MOS on resistance of 8 Ω is generated at the terminals A and B of the motor 240. Here, since the terminals A and B of the motor 240 are in a short state, inverse electromotive force generated during folding is negligibly small. Therefore, the folder is opened/closed normally. In the automatic mode, the inverse electromotive force eliminator 230 receives the motor driving power MOTOR_VM from the CPU 200 so that channels #3 and #4 are turned off by a driving bias current flowing through pins #1 and #2 and the terminals A and B of the motor 240 are opened. Then, the motor 240 rotates in a rotating direction determined according to a motor driving signal applied from the motor driver 210. When the automatic mode is switched to the manual mode, the motor power controller 220 automatically blocks the motor driving power MOTOR_VM from the motor 240. Hence, the terminals A and B of the motor 240 are connected by the photo MOS relay 230 with an 8Ω resistance and as a result, the folder can be operated without generating an inverse electromotive force.

Figure 5:
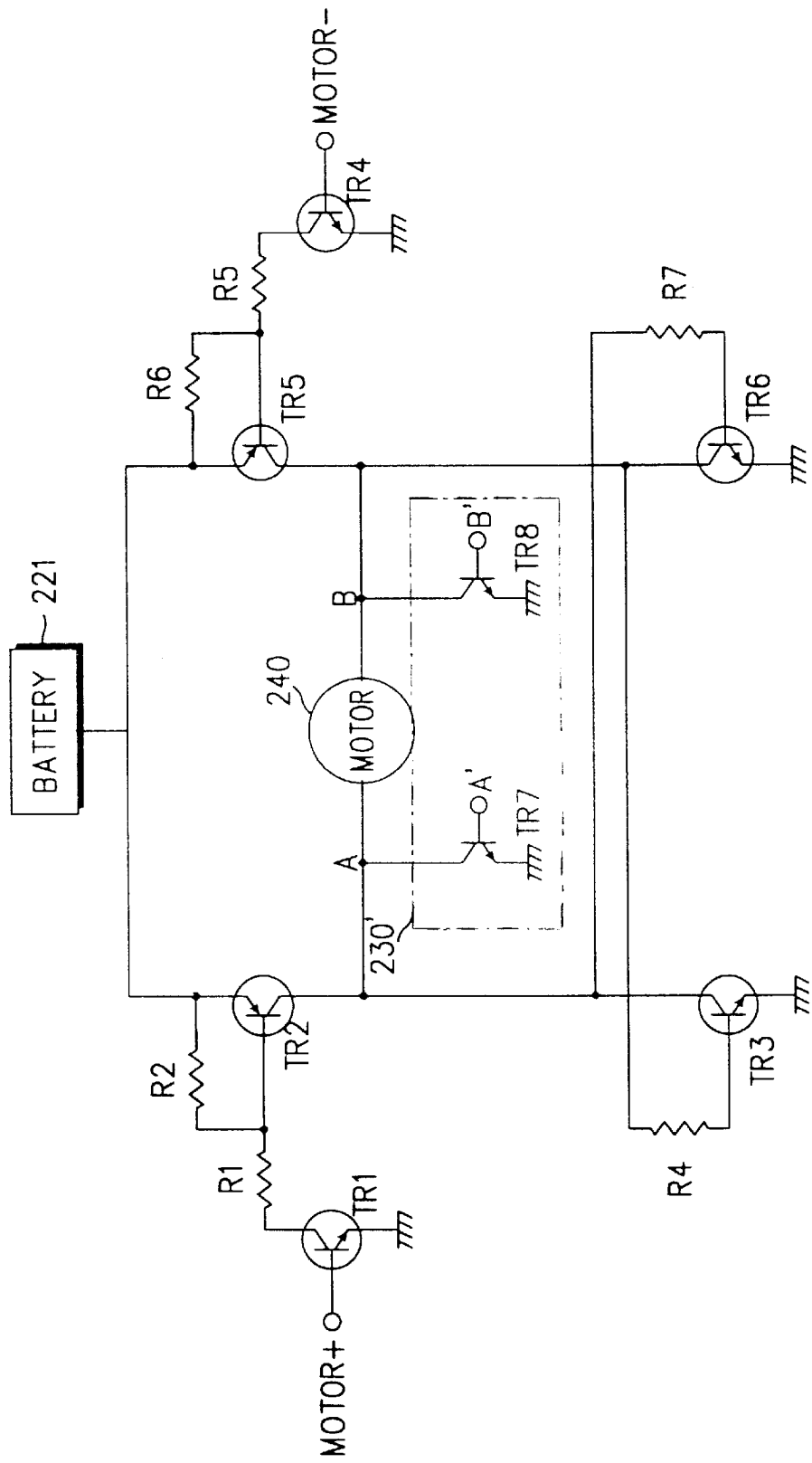
FIG. 5 is a detailed circuit diagram of another embodiment of the folder operation device in the automatically/manually foldable portable radio phone according to the present invention.

FIG. 5 is a circuit diagram of another embodiment of the folder operation device with an inverse electromotive force eliminator 230' constituted by transistors TR7 and TR8 according to the present invention. Referring to FIG. 5, the inverse electromotive force eliminator 230' has the transistors TR7 and TR8 connected to both terminals of the motor 240. In the manual mode, the inverse electromotive force eliminator 230' receives a control signal from the CPU 200 indicating to turn-on each transistor so that the terminals of the motor 240 are respectively connected to ground terminals to be shorted. In the automatic mode, the inverse electromotive force eliminator 230' receives a control signal from the CPU 200 to turn-off each transistor. Then the motor 240 operates the folder in a rotating direction determined by a driving control signal applied from the motor driver 210 regardless of the inverse electromotive force eliminator 230'.

Figure 6:
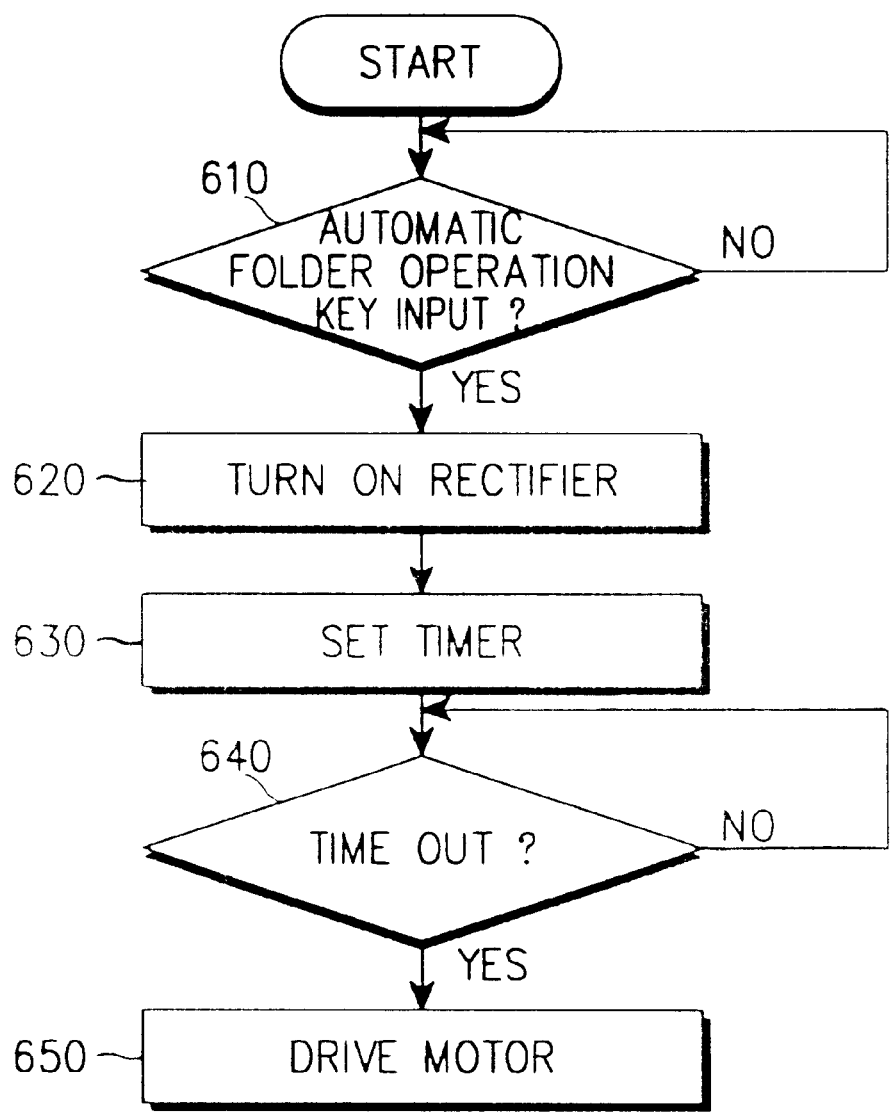
FIG. 6 is a flowchart illustrating a control operation for ensuring normal opening/closing of a folder in an automatic mode in the automatically/manually foldable portable radio phone according to the present invention.

FIG. 6 is a flowchart illustrating a control operation for ensuring normal opening/closing a sub-body from/to a main body in an automatic mode in the automatically/manually foldable portable radio phone according to the present invention. Referring to FIGS. 2 and 6, the CPU 200 determines whether an automatic folder operation key input has been received from the key input portion 180 in step 610.

Upon receipt of the automatic folder operation key input, the CPU 200 turns on the rectifier 222 by applying a power control signal indicating to turn-on the motor 240 to the motor power controller 220 in step 620. The CPU 200 sets an internal timer in step 630 and determines whether a predetermined time required to open connection between the inverse electromotive force eliminator 230 and the motor 240 has expired in step 640. If the predetermined time elapses, the CPU 200 controls the motor driver 210 to drive the motor 240 in step 650.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A circuit for preventing erroneous opening and closing in an automatically/manually foldable portable radio terminal having a main body and a sub-body rotatable with respect to the main body, comprising:
    a motor for providing a rotating force to automatically raise or lower the sub-body;
    a motor driver for driving the motor according to a motor driving direction control signal;
    an inverse electromotive force eliminator for eliminating an inverse electromotive force by opening or shorting both terminals of the motor according to an automatic mode or a manual mode; and
    a motor power controller for controlling supplying a driving power voltage to the motor.

2. The circuit of claim 1, wherein the inverse electromotive force eliminator shorts the terminals of the motor in the manual mode.

3. The circuit of claim 1, wherein the inverse electromotive force eliminator opens the terminals of the motor in the automatic mode.

4. The circuit of claim 1, wherein the inverse electromotive force eliminator includes a photo MOS relay.

5. The circuit of claim 1, wherein the motor power controller includes a battery for providing a predetermined power voltage, and a rectifier for rectifying the power voltage received from the battery and feeding the rectified voltage to the motor driver and the inverse electromotive force eliminator.

6. The circuit of claim 1, wherein the inverse electromotive force eliminator includes transistors at both the terminals of the motor, the transistors turning on, connecting to ground terminals, and shorting the terminals of the motor in the manual mode and turning off and opening the terminals of the motor in the automatic mode.

7. A method of operating a folder in an automatic mode in an automatically/manually foldable portable radio terminal, comprising the steps of:
    determining whether an automatic folder operation key has been pressed;
    turning on a rectifier to open both terminals of a motor upon receipt of the automatic folder operation key input; and
    driving the motor at the end of the opening of the motor terminals.

* * * * *